United States Patent
Neary et al.

(10) Patent No.: US 12,474,167 B2
(45) Date of Patent: *Nov. 18, 2025

(54) GEOPHYSICAL FIELD SENSING BASED NAVIGATION

(71) Applicant: SB Technology, Inc., Tarrytown, NY (US)

(72) Inventors: Patrick Loughrin Neary, Hyde Park, UT (US); Kimberly Margaret Moore, Redwood City, CA (US); Alexander James McNeil, Kalispell, MT (US); Ethan Jesse Pratt, Santa Clara, CA (US); Eddie Albert Rodriguez, Pacifica, CA (US)

(73) Assignee: SB Technology, Inc., Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,465

(22) Filed: Jul. 2, 2024

(65) Prior Publication Data

US 2025/0044098 A1 Feb. 6, 2025

Related U.S. Application Data

(63) Continuation of application No. 18/363,710, filed on Aug. 1, 2023, now Pat. No. 12,055,393.

(51) Int. Cl.
  *G01C 21/08* (2006.01)
  *G01C 21/00* (2006.01)
  *G06N 3/0442* (2023.01)

(52) U.S. Cl.
  CPC ........... *G01C 21/08* (2013.01); *G01C 21/387* (2020.08); *G06N 3/0442* (2023.01)

(58) Field of Classification Search
  CPC ...... G01C 21/08; G01C 21/206; G01C 21/20; G01C 21/387; G01R 33/02;
  (Continued)

(56) References Cited

U.S. PATENT DOCUMENTS

| 12,055,393 B1 * | 8/2024 | Neary | G06N 3/0442 |
| 2017/0010334 A1 * | 1/2017 | Krause | G01R 33/0017 |

(Continued)

FOREIGN PATENT DOCUMENTS

| CN | 109736775 A * | 5/2019 | E21B 47/00 |
| CN | 109856689 A * | 6/2019 | G01V 3/38 |

(Continued)

OTHER PUBLICATIONS

Canciani, "Magnetic navigation on an F-16 aircraft using online calibration," IEEE Transactions on Aerospace and Electronic Systems, Aug. 4, 2021, 58(1), 35 pages.

(Continued)

*Primary Examiner* — Yuri Kan
(74) *Attorney, Agent, or Firm* — Fish & Richardson P.C.

(57) ABSTRACT

Disclosed are exemplary computer-implemented methods and systems for geophysical field sensing based navigation. One example of a computer-implemented method includes: receiving geophysical field data from at least one geophysical field sensor; synchronizing timing of the geophysical field data; de-noising, using a de-noising machine learning model, the geophysical field data removing noise from local sources of noise for the at least one geophysical field sensor to produce de-noised geophysical field data, the de-noising machine learning model trained using ground truth map data and training data corresponding to the ground truth map data; receiving map data from a geophysical map engine; performing error estimation by comparing the de-noised geophysical field data with the map data; and updating a (Continued)

position estimation based at least in part on the error estimation.

20 Claims, 11 Drawing Sheets

(58) Field of Classification Search
CPC ..... G01R 33/0017; G01V 3/38; H04W 4/026; G06N 3/08; G06N 3/0442; G06F 30/20; E21B 47/00
See application file for complete search history.

(56) References Cited

U.S. PATENT DOCUMENTS

| | | | |
|---|---|---|---|
| 2021/0160687 A1* | 5/2021 | Ross | G06N 3/08 |
| 2021/0211839 A1* | 7/2021 | Lee | H04W 4/026 |
| 2022/0128365 A1 | 4/2022 | Berkovich et al. | |

FOREIGN PATENT DOCUMENTS

| | | | | |
|---|---|---|---|---|
| CN | 109856689 B | | 6/2019 | |
| CN | 114218735 A | * | 3/2022 | ............. G06F 30/20 |
| EP | 2602590 A1 | | 6/2013 | |
| EP | 3708955 A1 | * | 9/2020 | ........... G01C 21/206 |
| JP | 2014238275 A | * | 12/2014 | ............. G01R 33/02 |

OTHER PUBLICATIONS

Gnadt et al., "Signal enhancement for magnetic navigation challenge problem," CsLG, Submitted on Jul. 23, 2020, arXiv:2007.12158, 12 pages.

International Search Report and Written Opinion of International Appln. No. PCT/US2024/037058, mailed on Oct. 14, 2024, 16 pages.

Love et al., "An International Network of Magnetic Observatories", EOS, Oct. 15, 2013, 94(42):373-384.

Xu et al., "Deepmad: Deep learning for magnetic anomaly detection and denoising," IEEE Access, Jul. 3, 2020, 8:121257-121266.

* cited by examiner

GEOPHYSICAL FIELD SENSING BASED NAVIGATION

CROSS-REFERENCE TO RELATED APPLICATION

This application is a continuation of, and claims priority to, U.S. patent application Ser. No. 18/363,710, filed Aug. 1, 2023, the entire contents of which are incorporated herein by reference.

TECHNICAL FIELD

The present disclosure relates to computer-implemented methods, media, and systems for geophysical field sensing-based navigation, e.g., real-time navigation based on magnetic and/or gravitational data.

BACKGROUND

Global Positioning System (GPS) based navigation uses a constellation of satellites orbiting Earth to provide a set of coordinated references for agents navigating below. However, in GPS-denied environments, GPS cannot be relied upon by agents for navigation.

SUMMARY

The present disclosure involves computer-implemented methods, media, and systems for geophysical filed sensing based navigation. One example computer-implemented method includes: receiving geophysical field data from at least one geophysical field sensor; synchronizing timing of the geophysical field data; de-noising, using a de-noising machine learning model, the geophysical field data to remove noise from local sources of noise for the at least one geophysical field sensor to produce de-noised geophysical field data, the de-noising machine learning model trained using ground truth map data and training data corresponding to the ground truth map data; receiving map data from a geophysical map engine; performing error estimation by comparing the de-noised geophysical field data with the map data; and updating a position estimation based at least in part on the error estimation.

The foregoing and other embodiments can each optionally include one or more of the following features, alone or in combination. In particular, one embodiment includes all the following features in combination. The method can include navigating in part based on the position estimation. The training data can include magnetometer data, location data and attitude data. The de-noising machine learning model can use a stacked long short term memory architecture. The de-noising machine learning model can include a Tolles-Lawson model. Receiving the geophysical field data can include receiving at least one of magnetic field data and gravitation field data and receiving the at least one of magnetic field data and gravitational field data can include receiving the at least one of magnetic field data and gravitational field data (i.e., each sensor read) at a rate of at least 1 Hz.

The map data can be stored in a tile structure including a set of tiles where each tile represents a specified geographic area and where each such geographic area includes layers, each layer corresponding to a different altitude. The layers can include at least one derived layer and the data for the at least one derived layer can be derived by applying a physics-based conversion to primary magnetic geophysical data determined at an altitude different than the altitude of the derived layer. The method can further include performing data pre-processing on the geophysical field data to provide engineered feature data. Synchronizing the timing of the geophysical field data can include using a data synchronization buffer. Synchronizing the timing of the geophysical field data can include using at least one of upsampling, downsampling, or a combination of both, of time series data to produce a consistent data rate across sensors.

The subject matter described in this specification can be implemented in particular embodiments so as to realize one or more of the following advantages. Real time geophysical field sensing based navigation for an agent can be achieved by real-time geophysical field map retrieval and machine learning based de-noising of geophysical data, e.g., magnetic and/or gravitational data. Geophysical field map(s) can be loaded and processed during real-time operations. Such loading and processing enables a navigation filter to perform map matching in real-time to determine a position estimate. Additionally, machine learning based de-noising of geophysical data, e.g., magnetic and/or gravitational data can remove platform and environmental noise in the measurement data in real-time, and therefore reduce an error in position estimation otherwise produced by the navigation filter.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements.

DETAILED DESCRIPTION

This disclosure relates to geophysical field sensing-based navigation, e.g., magnetic and/or gravitational field-based navigation, e.g., real-time navigation based on magnetic anomaly data. An agent navigating in an area can integrate pre-surveyed field map (e.g. an anomaly map) and sensing data to aid navigation of the agent in real time, without navigation aiding from global positioning system (GPS). Using real-time field map retrieval and machine learning based de-noising of the sensed magnetic and/or gravitational data can achieve real time magnetic and/or gravitational field sensing-based navigation.

Figure 1:
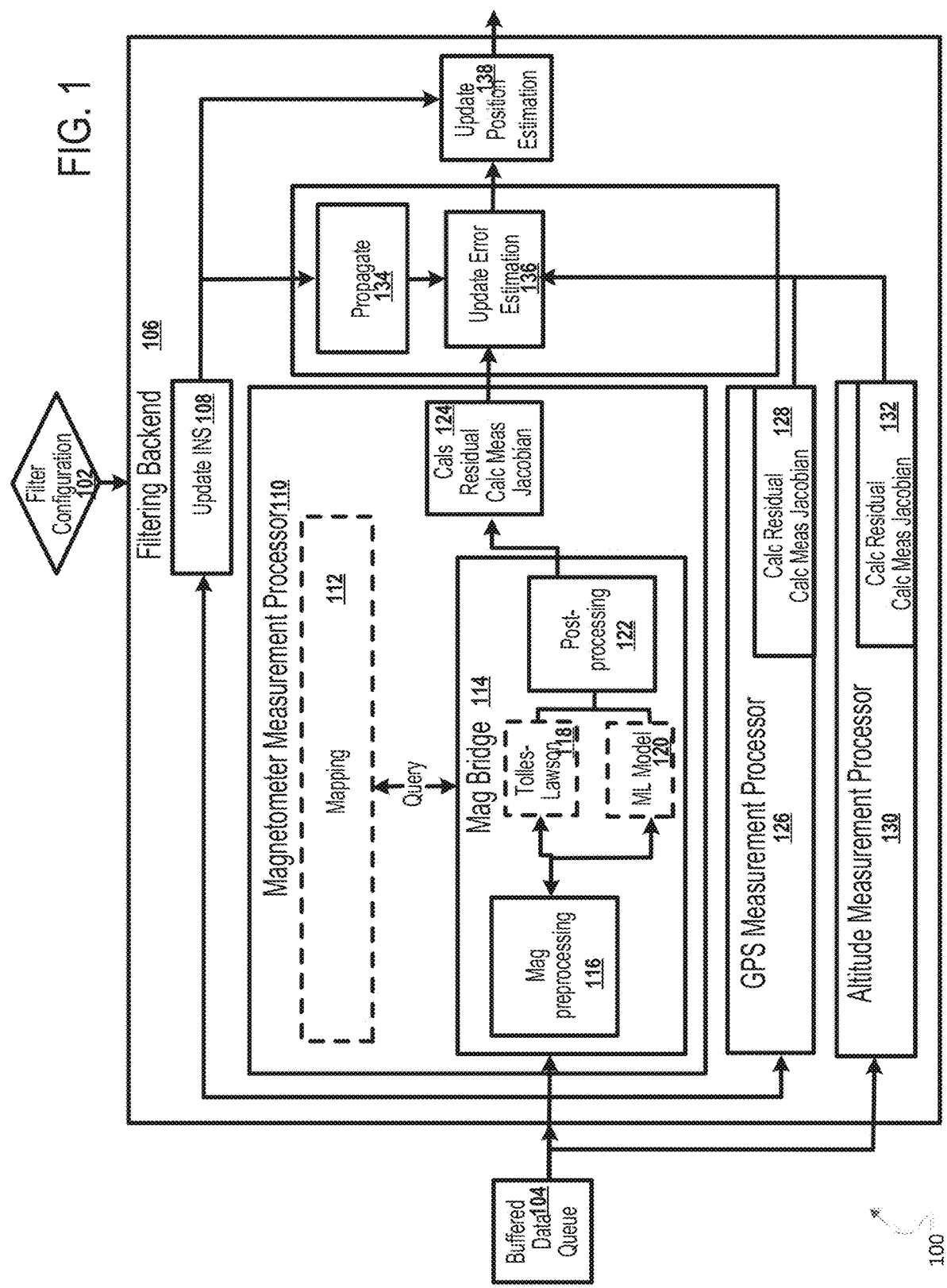
FIG. 1 is a schematic of one example of a geophysical field sensing-based positioning system, according to some implementations.

FIG. 1 is a schematic of one example 100 of a magnetic and/or gravitational field-based positioning system. For convenience, example 100 will be described as being implemented by a computer system having one or more computers located in one or more locations and programmed appropriately in accordance with this specification. An example of the computer system is the computing system 800 illustrated in FIG. 8 and described later.

With reference to FIG. 1 and at a high level, example system 100 operates as follows. All the filters start with a backend filter configuration 102 that defines backend filter parameters. The filter configuration 102 initializes the system. Once the filter configuration 102 configures system 100 and when the system 100 starts running, buffered data 104, e.g., data that is low-pass filtered and down-sampled in time, passes into the system. The data then starts aggregating inside of the filtering backend 106. An inertial navigation system (INS) 108, shown on the top of the filtering backend, processes inertial measurements. The system can use an error state Kalman filter and the system can track the error within an actual Kalman filter. A global position system (GPS) measurement processor 126 (shown in the bottom portion of FIG. 1) processes GPS measurements, if present, to calculate measurement Jacobian matrices and residuals 128 and provides them to the error estimation engine 136. Altitude measurement processor 130 (also shown in the bottom portion of FIG. 1) processes altimeter measurements to calculate measurement Jacobian matrices and residuals 132 and provides them to the error estimation engine 136.

Turning next to the magnetometer measurement processor 110, mag-bridge 114 ingests magnetometer measurements. Mag-bridge is a de-noising system. In different embodiments, the magnetometer measurements can pass through a Tolles-Lawson model first and then through a de-noising machine learning (ML) model or the magnetometer measurements can go through a de-noising machine learning model first and then pass through a Tolles-Lawson model or the magnetometer measurements can go through both models at the same time. If the data stream is split, e.g., in the parallel system embodiment, the system reunifies the data into one stream. In any event, once the data emerges from one or more of the models, post processing 122 can occur. In still other embodiments, the magnetometer measurements can utilize a de-noising machine learning model without a Tolles-Lawson model or a Tolles-Lawson model without a de-noising machine learning model.

Then, the system takes map values and queries the mapping engine 112. The magnetometer measurement processor 110 uses cleaned magnetometer measurement data produced by the mag-bridge 114 and mapping data from the mapping engine and calculates measurement Jacobian and residuals 124. The system can calculate a residual measurement by comparing where the system determines the navigating object to be based on the magnetometer measurement versus where the navigation object otherwise determined itself to be, e.g., using other navigation methods such as an INS. In certain implementations, Mag-bridge and the mapping engine do not have direct interaction. A magnetometer measurement model can manage data coming from mag-bridge and the mapping engine. In certain embodiments, MagBridge is responsible for handling calibration (i.e. de-noising raw measurements including interfacing with ML models), and the mapping engine is responsible for handling queries (in the form of positions) and returning map values at those queries. Once the system has both a calibrated magnetometer measurement (supplied by mag-bridge), and a map value (supplied by the mapping engine), the system calculates an error, the error is then used in an Extended Kalman Filter to calculate how well the system is determining position. Low error—when the system's value from the mapping engine is close to the system's value from mag-bridge means that the system is tracking position well, high error means that the navigating object is off from its optimal/predicted position. This error information allows the system to steer a solution based on this information. Overall, one query is used and 1 value is returned from mag-bridge, and no searching or nulling is done. Certain implementations use a standard Extended Kalman Filter.

Thus, all the measurements (e.g., attitude, magnetometer, INS, GPS and/or altimeter) are provided as updates to the Kalman filter. The Kalman filter updates and location errors are propagated 134. Using the INS data and the updated errors, the system produces updated position estimation 138, i.e., the system outputs position and velocity for the navigating object (interchangeably referred to herein as an agent or a navigating agent).

Stated differently, the magnetic and/or gravitational field-based positioning system in example 100 includes a navigation system, for example, an inertial navigation system (INS), that provides navigation states (e.g., three-dimensional (3D) position, velocity, and attitude) at 108. The magnetic and/or gravitational field-based positioning system also includes a navigation filter, for example, a Kalman filter, that estimates, at 136, errors in the navigation states updated at 108, as well as errors in raw data provided by components of the navigation system (e.g., inertial measurement unit (IMU) of the INS) and used by the navigation system to generate the navigation states of the agent. Example errors in the raw data provided by the components of the navigation system can include drifts in the accelerometers and gyros of the IMU(s) in the INS. The navigation filter also updates at 136, using measurement residuals and measurement Jacobian matrices from 124, 128, and 132. A propagation engine 134 propagates estimated errors described above from the previous navigation filter update time to the current navigation filter update time. The measurement residuals are associated with measurement data that are used to aid the navigation filter in estimating the errors in the navigation states provided by the navigation system. The measurement data in example 100 can include, for example, magnetic field measurement data at the location of the agent from one or more magnetometers and/or magnetic gradiometers, altitude measurement data of the agent, or GPS measurement data from one or more GPS receivers onboard the agent. A global or regional magnetic field map (e.g. an anomaly map) can be processed at 112 for real-time comparison to the measurement data at 124. A machine learning (ML) model can be used at 120 to de-noise the measured data in real time. The ML model at 120 can also be used together with a Tolles-Lawson model 118 when de-noising the measured data.

Alternatively or in addition to the magnetic field measurement data, the measurement data in example 100 can include, for example, gravitational field measurement data at the location of the agent from one or more gravitational field measurement devices such as a gravimeter. The system can process at 112 a global or regional gravitational field map (e.g. an anomaly map) for real-time comparison to the measurement data at 124.

More specifically, at 102, a computer system configures the navigation filter of the magnetic field-based and/or gravitational field-based positioning system. In some implementations, the filter configuration at 102 can be used to configure parameters of the navigation filter, for example, initial covariance of navigation filter states such as errors in estimated three-dimensional (3D) position, velocity, and attitude of the agent and errors in the raw data provided by components of the navigation system, for example, drifts in the accelerometers and gyros of the IMU(s) in the INS. The parameters configured at 102 can also include the covariance of errors in measurement data.

At 104, the computer system buffers data from different measurement sources. In some implementations, the data from different measurement sources can be time-aligned when buffered.

Figure 6A:
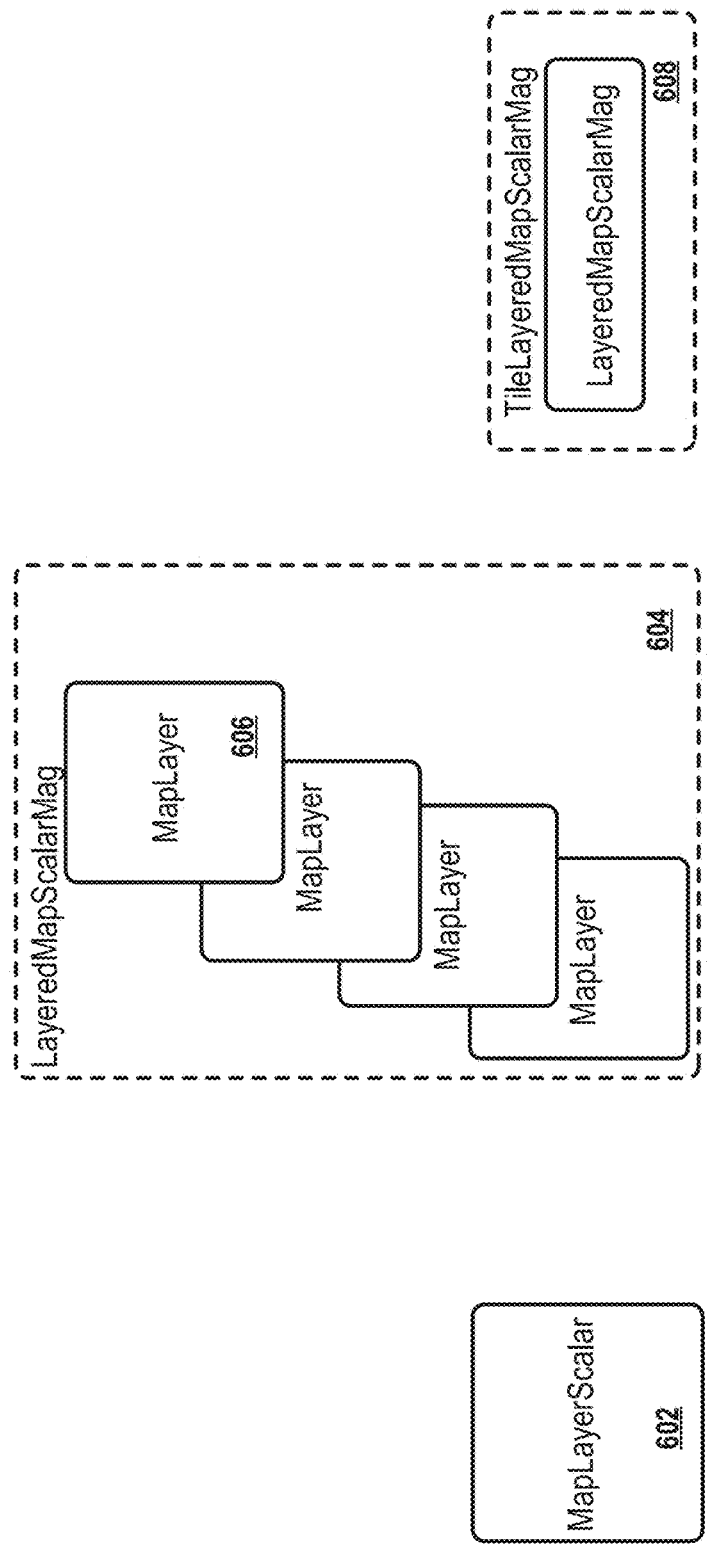
FIGS. 6A and 6B shows one example of a tiled map data serving approach, according to some implementations.
Figure 6B:
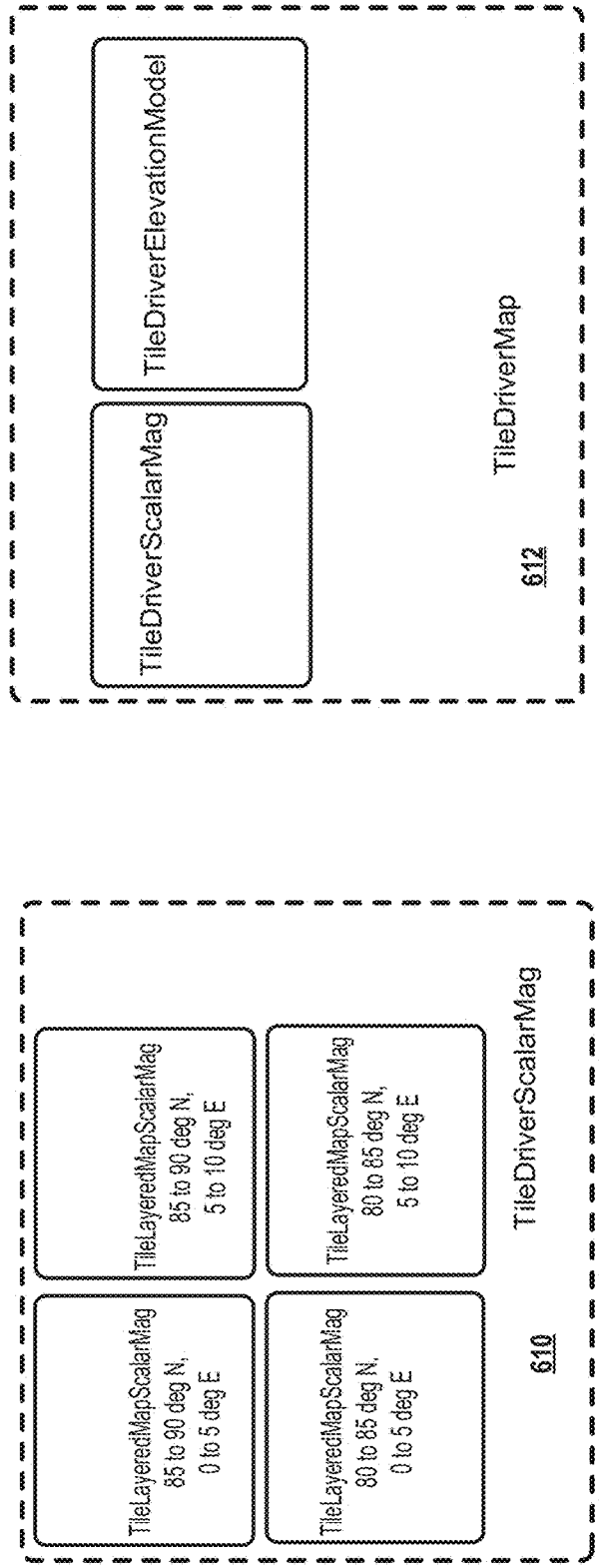

At 110, the computer system processes data from one or more magnetometers and/or gravimeters onboard the agent in order to use the data to aid the navigation filter. In some implementations, data in an anomaly map can be queried and retrieved in real-time from mapping 112 by mag bridge 114 that processes the retrieved anomaly map data. The real-time query and retrieval of map data is illustrated in FIGS. 6A and 6B and described later.

In some implementations, the computer system can pre-process the sensor data from buffered data queue 104 in mag preprocessing 116, where the data is preprocessed for initial cleaning of the data. Mag preprocessing 116 can include spectral methods and filters, which can be signal processing methods, AI methods, or other methods.

In some implementations, the computer system can use ML model 120 to denoise the preprocessed data from mag preprocessing 116 in real-time. Examples of ML model 120 can include, but not limited to, stacked long short-term memory (LSTM) neural networks, deep neural networks, one-dimensional (1D) convolutional neural networks, auto-encoders, ensembled models, and liquid neural networks. Table 1 includes representative parameters used in a stacked LSTM network for ML model 120. An example device for running ML model 120 is a Nvidia® Jetson Xavier edge device.

TABLE 1

| Parameters | Values |
| --- | --- |
| Number of layers | 2 |
| Hidden size | 64 |
| Activation type | Swish activation |
| Connection | Bidirectional |
| Loss function | Mean squared error (MSE) loss function |
| Optimizer | Adam optimizer |
| Number of epochs | 20 |
| Learning rate | 3e-3 |
| Batch size | 256 |
| Cross validation, k folds | 2 |

In some implementations, the computer system can combine ML model 120 with a Tolles-Lawson model to denoise the preprocessed data from mag preprocessing 116 in real-time. The Tolles-Lawson model can be used to calibrate in real-time within the navigation filter the magnetic fields surrounding the navigating agent, when the agent follows specific trajectories (e.g., while traversing different directions so that magnetic noise sources can be removed from the data by the navigation filter. Example magnetic noise sources can include local noise sources such as noises from the platform carrying the magnetic field sensors (e.g., airplane, car, boat, etc.). Electronics, metal, magnets, etc. in the platform itself can produce magnetic signal that corrupts the measured field, e.g., a measured anomaly field.

In some implementations, the computer system can post-process the denoised anomaly measurement data from ML model 120 in postprocessing 122 in order to perform, for example, unit conversions of the data.

At 124, the computer system processes post-processed measurement data from post-processing 122 in order to use the data to aid the navigation filter in estimating the errors in the navigation states provided by the navigation system. Post-processed anomaly measurement data can be compared against map data retrieved from mapping 112 based on the position of the agent estimated by the navigation filter, in order to generate anomaly measurement residuals at 124. Measurement Jacobian matrix data can also be generated at 124 using the functional relationship between errors in measurement data and errors in navigation filter states, as well as estimated navigation states of the agent.

At 126, the computer system processes available GPS measurement data in order to use the data to aid the navigation filter in estimating the errors in the navigation states provided by the navigation system. GPS measurement data, for example, GPS range and pseudo-range data measured between GPS satellites and the agent, can be compared against corresponding data estimated by the navigation filter based on the position of the agent estimated by the navigation filter, in order to generate GPS measurement residuals at 128. GPS measurement Jacobian matrix can also be generated at 128 using the functional relationship between errors in GPS measurement data and errors in navigation filter states, as well as estimated navigation states of the agent.

At 130, the computer system processes altitude measurement data of the agent in order to use the data to aid the navigation filter in estimating the errors in the navigation states provided by the navigation system. Altitude measurement data can be compared against altitude estimated by the navigation filter based on the position of the agent estimated by the navigation filter, in order to generate altitude measurement residuals at 132. Altitude measurement Jacobian matrix can also be generated at 132 using the functional relationship between errors in altitude measurement data and errors in navigation filter states, as well as estimated navigation states of the agent.

At 108, the computer system updates the navigation states of the agent provided by the navigation system, for example, an INS onboard the agent, based on the raw data provided by components of the navigation system (e.g., inertial measurement unit (IMU) of the INS), in order to use the updated navigation states of the agent in the navigation filter.

At 134, the computer system propagates the navigation filter states from the previous navigation filter update time to the current navigation filter update time.

At 136, the computer system updates the navigation filter state errors and their associated covariance based on the propagated navigation filter states from 134 and the measurement residuals and measurement Jacobian matrices from 124, 128, and 132.

At 138, the computer system updates the estimated position of the agent based on the updated navigation filter state errors and navigation states of the agent updated at 108. The updated estimated position of the agent can then be used for navigation of the agent. As such, the magnetometer based measurement data can be used together with map data in real time to aid the navigation filter in estimating the navigation states of the agent in real time.

Figure 2:
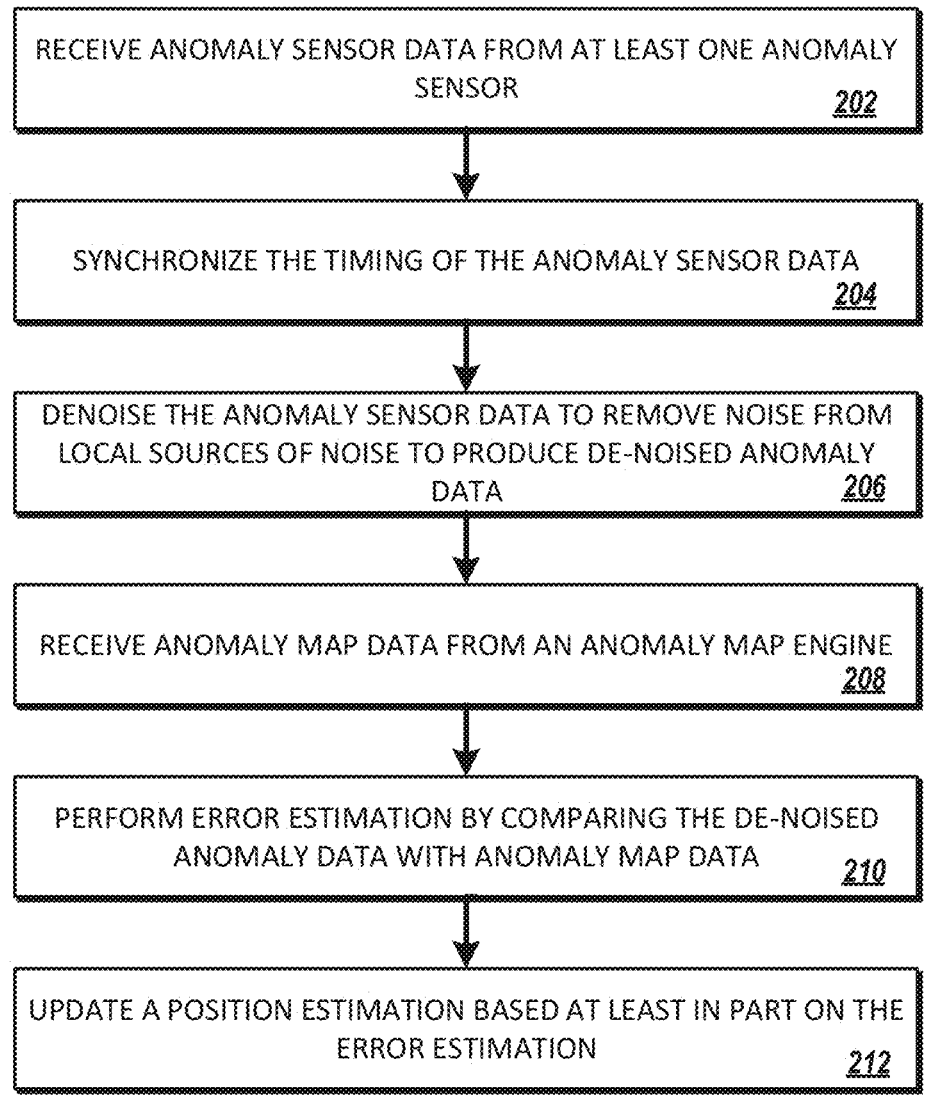
FIG. 2 is a flowchart illustrating one example of a process for performing geophysical field sensing based positioning, according to some implementations.

FIG. 2 is a flowchart illustrating one example 200 of a process for performing geophysical field sensing-based positioning. For convenience, example 200 will be described as being performed by a computer system having one or more computers located in one or more locations and programmed appropriately in accordance with this specification. An example of the computer system is the computing system 800 illustrated in FIG. 8 and described later.

At 202, the computer system receives geophysical field sensor data from at least one sensor. At 204, the computer system synchronizes the timing of the sensor data. At 206, the computer system de-noises, using a de-noising machine learning model, the sensor data to remove noise from local sources of noise for the at least one sensor to produce a de-noised data, where the de-noised machine learning model is trained using ground truth map data and training sensor data corresponding to the ground truth map data. At 208, the computer system receives map data from an map engine. At 210, the computer system performs error estimation by comparing the de-noised data with map data. At 212, the computer system updates a position estimation based at least in part on the error estimation.

Figure 3A:
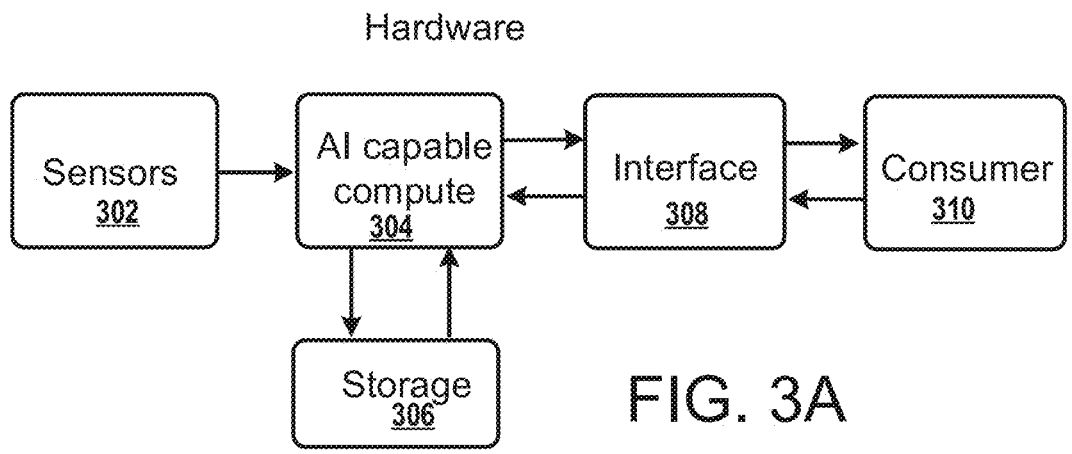
FIG. 3A is an example of a baseline hardware configuration for an geophysical field sensing based positioning system, according to some implementations.

FIG. 3A is an example of a baseline hardware configuration for an geophysical field sensing based positioning system. The baseline hardware configuration can enable acquisition of data from sensors in 302, a compute platform 304, storage 306, an interface 308 for exchanging information, and an external platform 310.

In some implementations, sensors in 302 can represent the range of sensors that can feed into the geophysical field measurement data—and agent position estimation processes described in FIG. 1. Sensors in 302 can include, but are not limited to, temperature sensors, altitude sensors, inertial navigation system, scalar magnetometers, vector magnetometers, magnetic gradiometers, gravimeters, pressure sensors, and humidity sensors. Sensors in 302 can provide the raw environmental measurements that are used to extract and infer accurate magnetic readings.

In some implementations, artificial intelligence (AI) capable compute 304 can be a compute platform capable of running AI algorithms fast enough to produce position estimates (or other data products) at real-time rates. AI capable compute 304 can be a single physical processing unit, or can be composed of multiple, physically separate processing units that handle different aspects of the data processing and inference. For example, a separate processing unit in AI capable compute 304 can be attached to a sensor, a sensor type, or a group of inputs and process data before passing the data on to systems downstream. AI capable compute 304 is not confined to one physical unit. Several processing units in AI capable compute 304 can be used in a distributed fashion.

In some implementations, storage 306 can be a medium for storing data. Storage 306 can include a suite of storage devices including universal serial bus (USB) card, solid-state drive (SSD), network mounted, cloud storage, or other storage devices. Storage 306 is responsible for not only storing captured measurement data but also to store data used by the system for performing computations. For example, Storage 306 can contain magnetic map data or other types of historical data, for example, recent space weather measurements, that can be used for processing measurement data.

In some implementations, interface 308 can be a physical or wireless connection point and software-based application programming interface (API) that handles data communication between the invention and the external platform.

In some implementations, consumer 310 can represent a suite of potential consumers of data products from interface 308. In this context, a consumer can be a recipient of data from interface 308. Consumer 310 can include multiple families. For example, a status family can include a family of consumers that consists of status displays. A display can be light based (for example, an LED or incandescent) indicator. It can be audio-based. Status displays can also include dashboards that provide sensor data, data derived from sensors, position information, and system status. A raw data family can include consumers that ingest raw sensor data or lightly processed data. A calibrated data family can include consumers that consume calibrated sensor data. A map data family can include consumers that import reference magnetic field data (e.g., map data). A position/navigation/timing (PNT) data family can include consumers that use, aggregate, or display PNT data from interface 308.

Figure 3B:
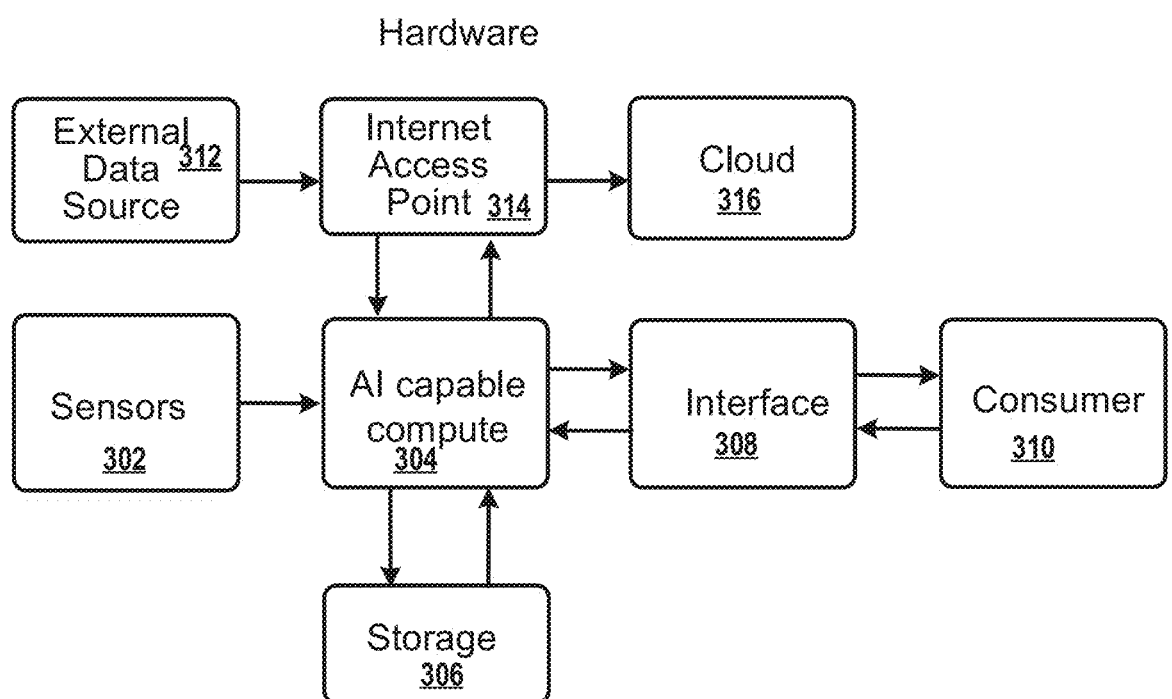
FIG. 3B is another example of a hardware configuration for an geophysical field sensing based positioning system, according to some implementations.

FIG. 3B is another example of a hardware configuration for a magnetic and/or gravitational field-based positioning system. The configuration in FIG. 3B shows three additional blocks when compared to the configuration in FIG. 3A. In some implementations, internet access point (IAP) 314 can enable additional system capabilities. Additional types of information can be useful when performing onboard computations. The IAP can provide access to external data source 312, cloud 316, and can position the systems as an Internet of Things (IoT) platform.

In some implementations, IAP 314 can provide access to external data source 312 and enable the magnetic and/or gravitational field-based positioning system to acquire and use the data from external data source 312. One example of external data is space weather data. Space weather is composed, in part, by magnetic fields generated by the sun's interaction with the earth's atmosphere. The resulting magnetic fields are coupled into measurements made by a magnetometer sensor. Querying space weather sources, and accounting for that noise, can improve the accuracy of magnetometer readings.

In some implementations, cloud 316 can provide many benefits, for example, cloud storage, additional cloud compute, and database access. From the perspective of the geophysical field sensing based positioning system as an IoT edge device, cloud 316 can facilitate the flow of data between devices.

Figure 4A:
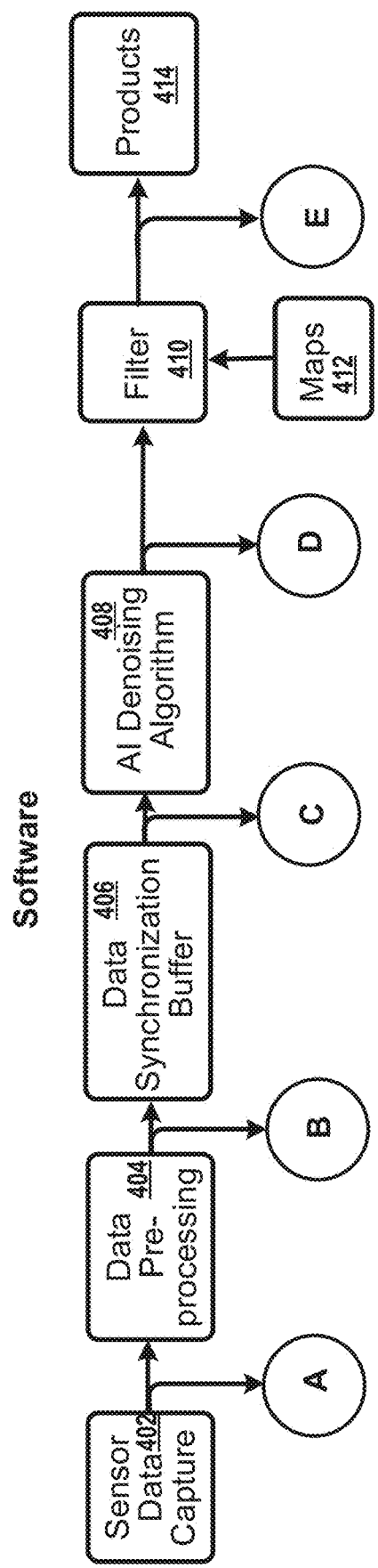
FIG. 4A is an example of a baseline software configuration for an geophysical field sensing based positioning system, according to some implementations.

FIG. 4A is an example of a baseline software configuration for a geophysical field sensing based positioning system. In some implementations, measurement data can be captured from the attached sensors onboard an agent during sensor data capture 402 and streamed to a buffer 406. Data synchronization buffer 406 can perform some data cleaning and then align the data. As sensors may capture data at different rates, data synchronization buffer 406 can up sample or down sample data so that measurements are aligned in time. Once aligned, data can be passed to the AI denoising algorithm 408 for denoising.

In some implementations, sensor data capture 402 includes the capture of readings from sensors. The actual capture can happen through threads, processes, interrupts, or other fixed timing based approaches.

In some implementations, data preprocessing 404 can include preprocessing methods for initial cleaning of data. This preprocessing can include spectral methods and/or filters. These methods can include signal processing methods, AI methods, or other methods.

In some implementations, data synchronization buffer 406 can include processes to receive sensor data from sensors that capture data at different sampling rates and at different points in time and synchronize the data streams through methods such as upsampling, downsampling, and resampling.

In some implementations, AI denoising algorithms 408 can include AI or other spectral and/or signal processing methods that remove noise from the data. Data may be the unprocessed raw data, preprocessed data, synchronized data, and/or engineered features derived from that data.

In some implementations, filter 410 can include a navigation filter (for example, a Kalman filter, particle filter, or another filter) that takes inputs from the maps 412, the AI denoising algorithm 408, and/or other measurements (including IMU measurements) and combines these inputs to estimate the current position of an agent. The estimated position can then be published as a product 414.

In some implementations, maps 412 can include reference geophysical data (including magnetic and/or gravitational map data) that enable positioning capabilities. By combining this geophysical data with information generated from sensor data capture 402 (for example, measured magnetic or gravity fields) and/or the AI denoising algorithm 408, the geophysical field sensing based positioning system can determine the position of the agent.

In some implementations, products 414 can include the final products from the geophysical field sensing based positioning system, for example, status, metrics, and PNT information of the agent.

In some implementations, intermediate products are represented in FIG. 4A by cells A-E, where cell A represents raw sensor output, cell B represents reprocessed sensor data along with the corresponding engineered features from that data, cell C represents time synchronized data (where measurements may be upsampled or downsampled), cell D represents data that has been processed by the denoising/AI processing algorithm, and cell E represents products from the navigation filter and/or map products.

Figure 4B:
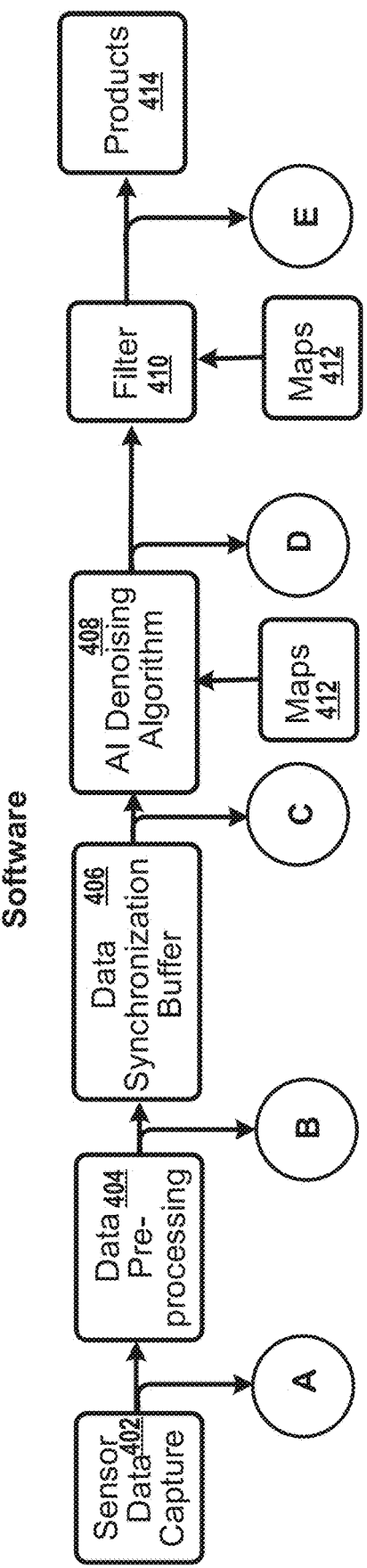
FIG. 4B is another example of a software configuration for an geophysical field sensing based positioning system, according to some implementations.

FIG. 4B is another example of a software configuration for an geophysical field sensing based positioning system. When compared to the software configuration in FIG. 4A, map data, e.g., map data 412, is fed not only into filter 410, but also into the AI de-noising algorithm 408 for processing.

While FIGS. 3A, 3B, 4A, and 4B show self-contained PNT systems, in some implementations, the geophysical field sensing based positioning system can also be modular. The hardware/software configurations shown in FIGS. 3A, 3B, 4A, and 4B can be used as a stand-alone system that produces a position estimation, or they can also be used in a modular fashion where intermediate products are produced as discussed in FIG. 4A. For example, consumer 310 in FIGS. 3A and 3B can run its own suite of algorithms for position estimation or other functions. In this case, other blocks in FIGS. 3A and 3B can capture readings from sensors 302, denoise the captured sensor readings using AI capable compute 304, and provide a cleaned set of measurements through interface 308. This case can correspond with intermediate product E in FIGS. 4A and 4B.

Figure 5A:
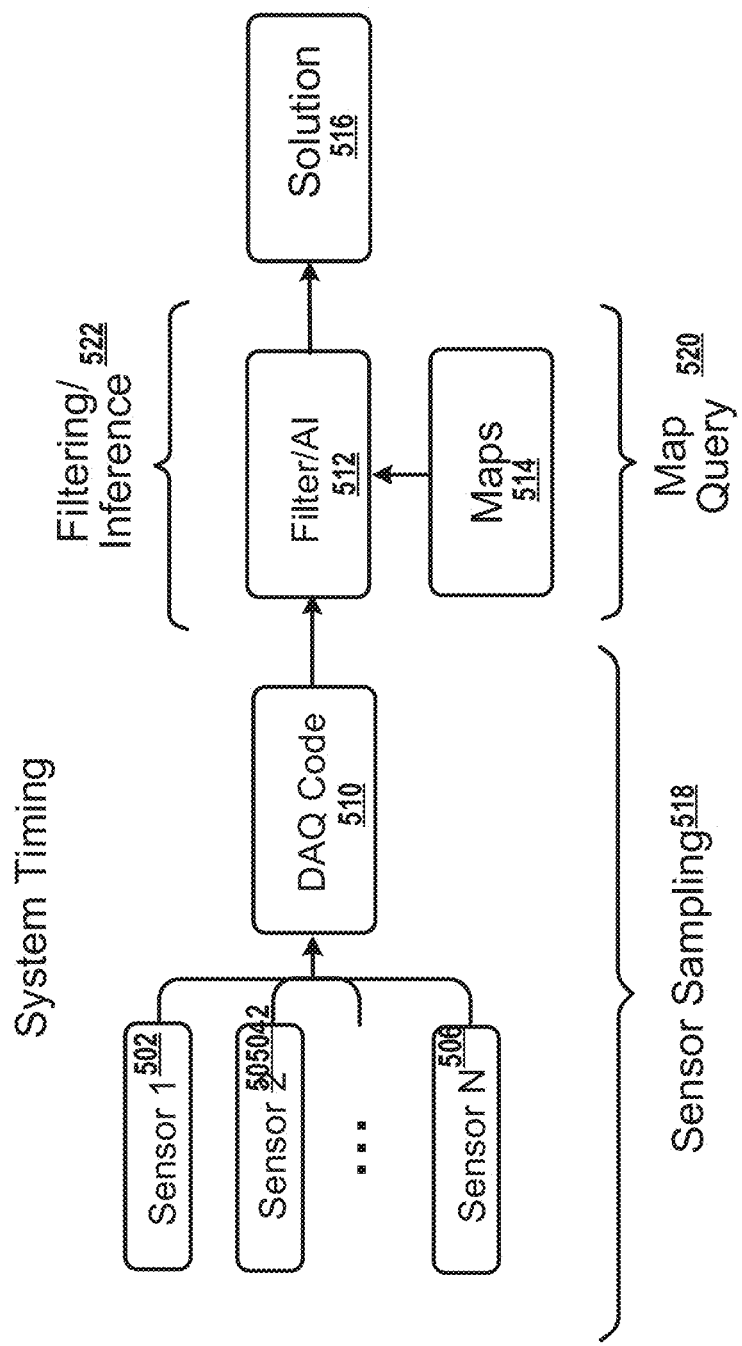
FIG. 5A is one example of data flow in an geophysical field sensing based positioning system, according to some implementations.

FIG. 5A is one example of data flow in an geophysical field sensing based positioning system. In some implementations, data processing within the geophysical field sensing based positioning system follows the flow shown in FIG. 5A. In some embodiment, Sensors 502 to 506 can capture data at frequencies that range from several Hz to multiple KHz. In other embodiments, sensors can capture data at MHz ranges. Data acquisition (DAQ) code 510 receives sensor data from multiple sensors and passes the data to filtering/inference 522. Filtering/inference 522 includes filter/AI 512. Map data from Maps 514 can also be provided to filtering/inference 522 as needed. The filter/AI then produces a final solution 516.

In some implementations, real-time performance can mean different things to different systems. For example, position estimation requirements vary for a craft navigating in or on water vs. a vehicle navigating streets vs. an aircraft. Different factors can play into the definition of a real-time performant system including the velocity of the platform as well as required accuracy for navigation.

In some implementations, the current positioning rates are provided on a per-second basis. Specific requirements of live/real-time operation can vary, e.g., based on the appropriate regulatory guidelines, for a given use case. Some systems, for example, high velocity vehicles, may require a much higher positioning update rate. In those scenarios, faster sampling frequencies and processing hardware can be used to provide faster position update rates. On the other hand, a vessel traveling slowly on the open ocean may require positioning updates much less frequently. In this case sampling rates may be slowed. Definitions of real-time can vary by platform and by the respective positioning requirements. The data flow in FIG. 5A can address needs from high velocity, high precision platforms to low speed and low precision requirements.

Figure 5B:
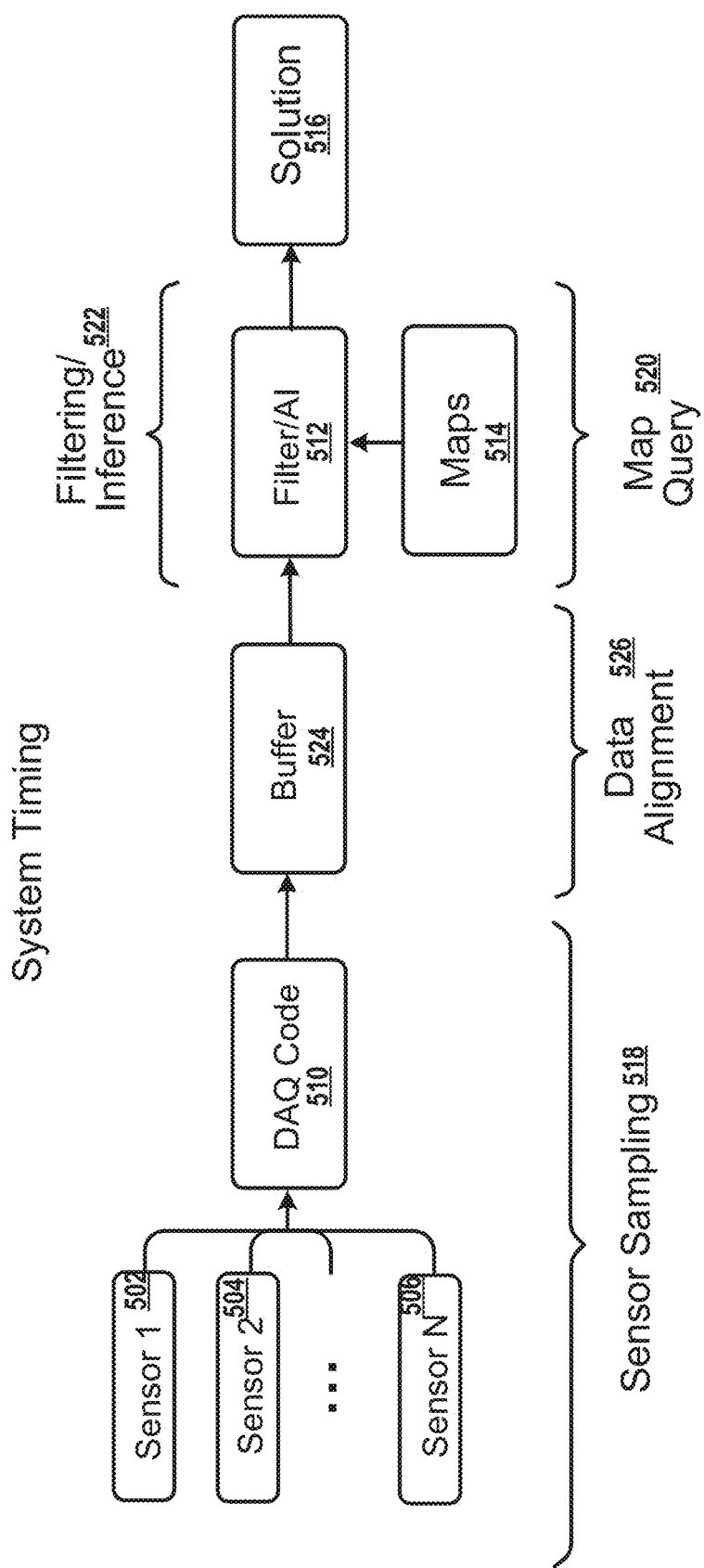
FIG. 5B is another example of data flow in an geophysical field sensing based positioning system, according to some implementations.

FIG. 5B is another example of data flow in an geophysical field sensing based positioning system. In some implementations, there may be a need to have data aligned in time. In this case, buffer 524 can be added. Within the buffer, data can be resampled to a common, time-aligned frequency. Once aligned, data can be passed to filtering/inference 522 and data flows as previously described for FIG. 5A.

Figure 5C:
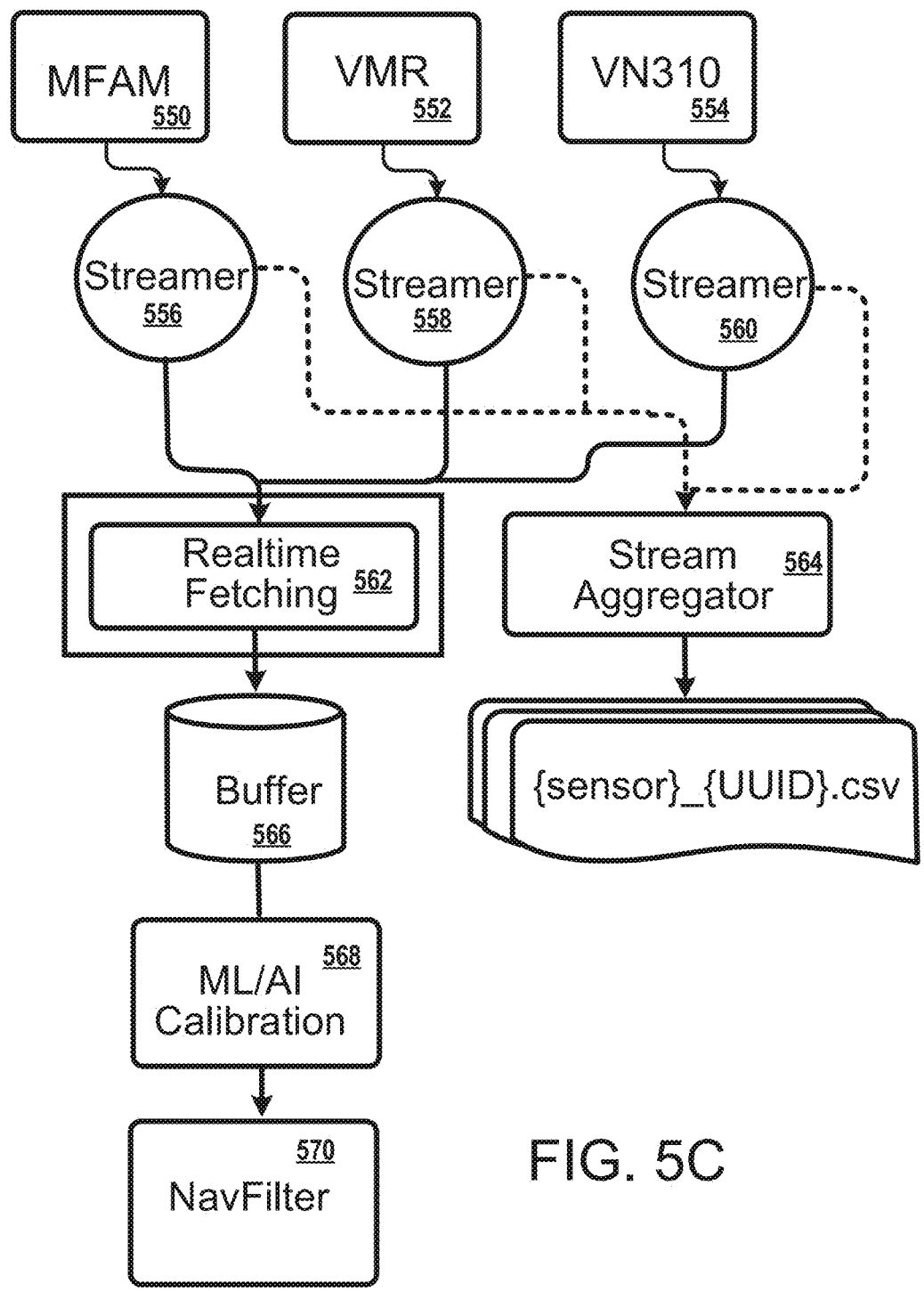
FIG. 5C is yet another example of data flow in an geophysical field sensing based positioning system, according to some implementations.

FIG. 5C is yet another example of data flow in an geophysical field sensing based positioning system. In some implementations, different sensor types, for example, magnetometer sensor MFAM 550, magnetometer sensor VMR 552, and GPS-aided inertial navigation system VN310 554 can be defined in a file, for example, a JavaScript Object Notation (JSON) file. Streamers 556 to 560 can be declared in files and configured based on JSON data. Each streamer can contain a circular buffer which can use an active bit for fault detection. A real-time aggregator can poll data at realtime fetching 562 and pipe the fetched data to a ML/AI Buffer 566. Buffer 566 can handle pre-processing of the data from realtime fetching 562 and offload processed data to the Navigation filter 570, after the processed data is first calibrated for ML/AI processing. CSV files in FIG. 5C can be staged for postprocessing analysis of the fetched data.

FIGS. 6A and 6B show one example of a tiled geophysical map data serving approach. This approach can be used in mapping 112 of FIG. 1 to implement a real-time or near real-time retrieval of map data. In certain embodiments, the map processing and data retrieval is fast enough to meet the performance requirements of the platform carrying the device. In some implementations, the mapping engine provides map data on a per-second basis. In other embodiments, the mapping engine provides requested map data within 0.1 seconds of a request. Specific requirements of live/real-time operation can vary, e.g., based on the appropriate regulatory guidelines, for a given use case. For convenience, this approach will be described as being implemented by a computer system having one or more computers located in one or more locations and programmed appropriately in accordance with this specification. An example of the computer system is the computing system 800 illustrated in FIG. 8 and described later.

Given that in many types of magnetic and/or gravitational field-based navigation, e.g., aerial navigation or underwater navigation, a field map, e.g., a magnetic anomaly map, needs to address altitude as well as latitude and longitude, i.e., the map is not just a flat map. As a result, a map engine loading all map data can exceed the RAM and/or storage of a computer, especially in the size of device that one would often want to use for geophysical field sensing-based navigation. For example, geophysical field map data for the whole world can be more than a terabyte or more than 10 terabytes (for a basic level of accuracy; requirements may change to meet different regulatory standards). Thus, an improved tiled map data serving process and map memory management system that facilitates dynamically loading and unloading tiles from magnetic memory helps to make real-time magnetic and/or gravitational field-based navigation possible.

At 602 in FIG. 6A, a computer system can use functions embedded in a software data class to load in map data, and store the map data as layers of a type that can be referred to as MapLayerScalar.

At 604, the computer system performs interpolations to generate predicted field data at a location. In some implementations, a collation of MapLayerScalar for the same geographic area can be stored in a layered map LayeredMapScalarMag. Each layer 606 of the layered map can be a slice of the geophysical field at a different altitude.

At 608, the computer system wraps the LayeredMapScalarMag from 604 in metadata that can be used by a tile driver shown in 610 (shown in FIG. 6B). The metadata describes what region of the tile is allowed to be queried, as well as the coordinate system of the layered map.

At 610, the computer system organizes the tiles using a tile driver TileDriverScalarMag. In some implementations, a sparse, slot based system can be used for the tile driver, where each region, for example, each 5 deg×5 deg region of the Earth, has a slot where a map tile may be added. TileDriverScalarMag can decide which map tile should be queried in response to input coordinates. The tiles can be stored in RAM or dynamic tile loading/closing can be enabled. In other words, a smart driver system can fetch a tile based on latitude and longitude so the system does not load terabytes into RAM at once. Once the smart driver system loads the correct tile, then it can go and query the appropriate layers within the tile.

At 612, the computer system builds a tile driver class TileDriverMap for a map, for example, the NAMAMNURE® 2008 map. In some implementations, one tile driver can be enabled for map tiles, and another tile driver can be enabled for digital elevation model (DEM) tiles. The DEM tiles are used to translate from the map's coordinates (e.g., "above ground level/AGL", i.e., height above topography), to coordinate system (e.g. WGS84) that uses height above ellipsoid or another proxy for the radial/vertical distance of an agent. In other words, in certain implementations, the system has a separate set of tiles the for topography, in order to convert coordinate systems from how the maps were measured to the geoids that the navigation system uses as its coordinate system. Certain implementations can tile the relevant geography in magnetic and/or gravitational fields (e.g., magnetic and/or gravitational anomalies), and also tile the relevant geography in topography, so that the system can do coordinate transforms.

Thus, the system can have layers of a specific region at a single altitude. The system can have a number of altitudes together of the same type of layer, which is encapsulated with some metadata. Each location has a corresponding tile and in each of these tiles is a stack of altitude layers.

In some embodiments, each individual tile actually has to be bigger than the latitude and longitude bounds beyond with the system will not allow a user to query the tile. When the system originally creates these tiles there can be 'edge effects' as the system extends the map up in altitude and so the system can mark those edge areas as not available for queries. The metadata can describe how big the tile actually is, versus what parts of the tile the system allows a user to query to avoid the errors on the edge effects of the physics extrapolations. Stated differently, the mapping engine can load data from a file (e.g., pre-cached). The data can come from pre-supplied maps, although the system can alternatively or in addition make its own maps and then load those.

Internal processing: Once the mapping engine has mapping data, it can generate physics-generated layers for different altitudes or different resolutions on demand. Additional operations can include coordinate transforms, geographic trimming or data cleaning/processing, interpolation or resolution improvement, and error/gradient analysis.

The maps engine/system can output a tiledriver, with map tiles. Coverage may be global or regional depending upon the required area to be navigated and available map data to be used.

Figure 7:
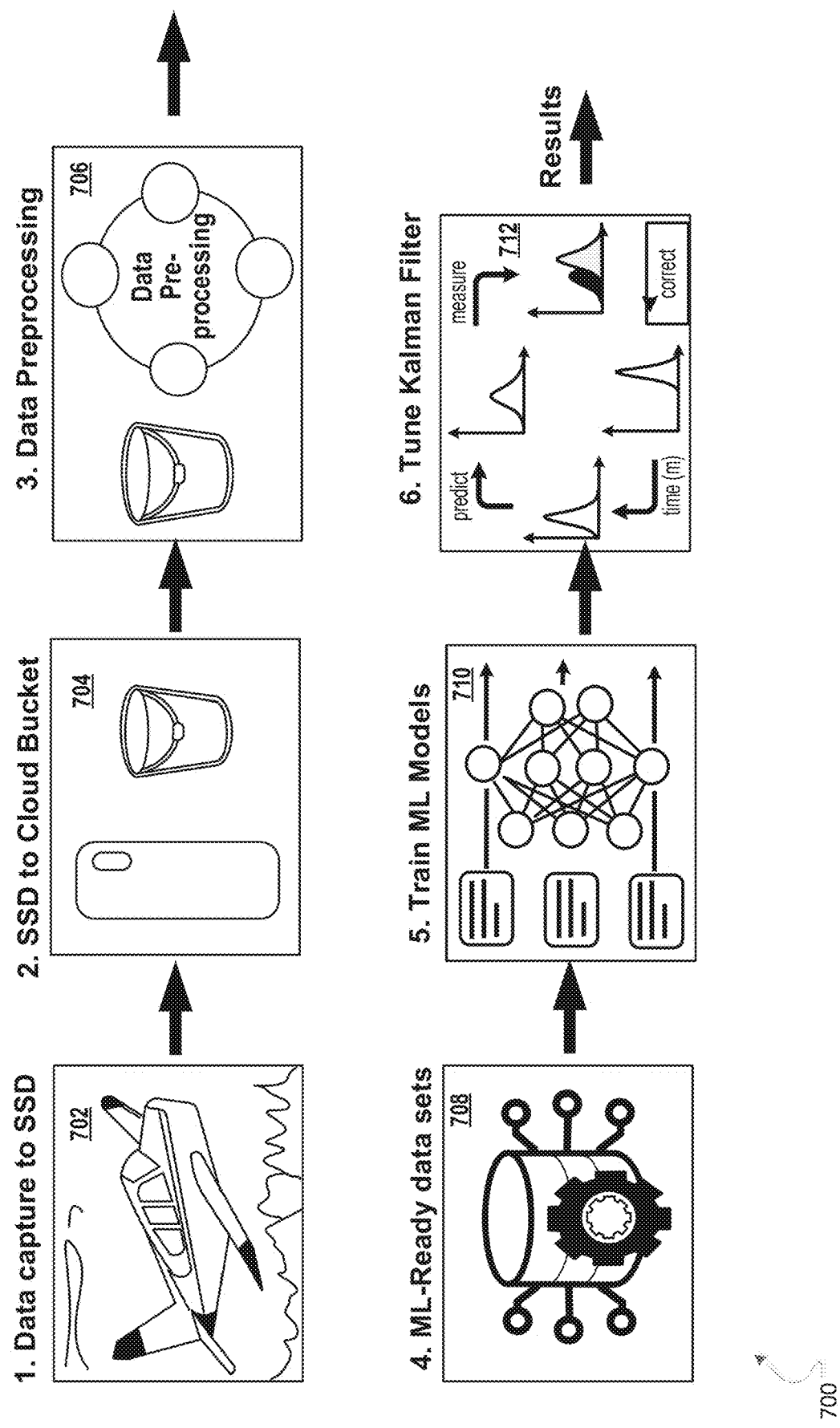
FIG. 7 shows one example of a data capture and model training methodology, according to some implementations.

FIG. 7 shows one example 700 of a data capture and model training methodology. For convenience, example 700 will be described as being performed by a computer system having one or more computers located in one or more locations and programmed appropriately in accordance with this specification. An example of the computer system is the computing system 800 illustrated in FIG. 8 and described later.

At 702, a computer system captures measurement data and stores the data in a storage device onboard an agent whose position is to be estimated by a navigation filter. An example of the storage device is a solid-state drive (SSD). In some implementations, the measurement data can include anomaly data measured by one or more magnetometers onboard the agent. Additionally, the measurement data can also include altitude measurement data of the agent. When available, GPS measurement data from one or more GPS receivers onboard the agent can also be captured by the computer system and stored in the storage device.

At 704, the computer system transfers the measurement data stored in the storage device at 702 to a cloud storage system, for example, a cloud bucket. In most situations, a navigating device will not have internet access while operating (at least not reliable enough to trust for real time processing). There is the potential for updating a ML model or filter parameters at the beginning of a flight. If that happens then data would be saved to the SSD (skipping the sync to the cloud) and the models could be updated.

At 706, the computer system preprocesses the geophysical measurement data from the cloud storage system in order to be used to aid the navigation filter in estimating the position of the agent. An example of the preprocessing of the geophysical measurement data is described in 116 of example 100 in FIG. 1. In some implementations, preprocessing the geophysical measurement data can be used to validate the data quality or to remove invalid data, for example, during sensor warm-up periods.

At 708, the computer system further processes the preprocessed measurement data into machine learning ready data sets. In some implementations, the preprocessed measurement data can be resampled to be time-aligned. The resampled data can then be converted into files that can be used to train machine learning models.

At 710, the computer system trains the machine learning model using the data sets from 708, in order to use the trained machine learning model to de-noise geophysical measurement data collected later. An example of the machine-learning model is described in 120 of example 100 in FIG. 1.

At 712, the computer system tunes the navigation filter, for example, a Kalman filter, based on the de-noised geophysical measurement data and other preprocessed measurement data from 706. The navigation filter parameters in filter configuration 102 of example 100 in FIG. 1 can be tuned in order to reduce the errors in estimated navigation states of the agent.

Figure 8:
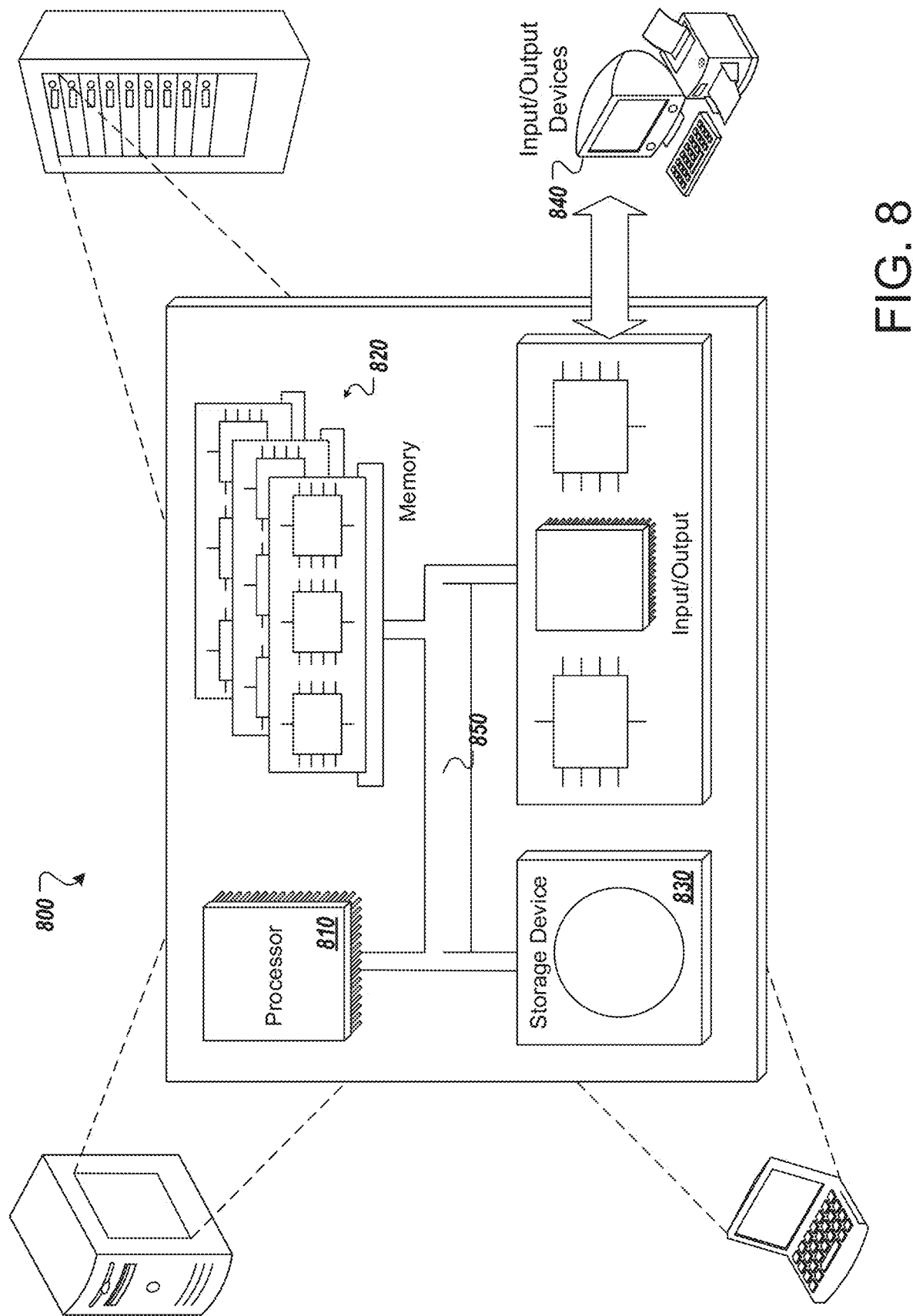
FIG. 8 is a schematic illustration of example computer systems that can be used to execute implementations of the present disclosure.

FIG. 8 illustrates a schematic diagram of an example computing system 800. The system 800 can be used for the operations described in association with the implementations described herein. For example, the system 800 may be included in the computer system discussed herein. The system 800 includes a processor 810, a memory 820, a storage device 830, and an input/output device 840. The components 810, 820, 830, and 840 are interconnected using a system bus 850. The processor 810 is capable of processing instructions for execution within the system 800. In some implementations, the processor 810 is a single-threaded processor. The processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit. The memory 820 is a non-volatile memory unit. The storage device 830 is capable of providing mass storage for the system 800. The storage device 830 is a computer-readable medium. The storage device 830 may be a floppy disk device, a hard disk device, an optical disk device, or a tape device. The input/output device 840 provides input/output operations for the system 800. The input/output device 840 includes a keyboard and/or pointing device. The input/output device 840 includes a display unit for displaying graphical user interfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

We claim:

1. A method comprising:
receiving geophysical field data from at least one geophysical field sensor onboard an agent;
synchronizing timing of the geophysical field data;
de-noising, using a de-noising machine learning model, the geophysical field data to remove noise from local sources of noise for the at least one geophysical field sensor to produce de-noised geophysical field data, the de-noising machine learning model trained using ground truth map data and training data corresponding to the ground truth map data;
receiving map data from a geophysical map engine, wherein the map data is stored in a tile structure comprising a set of tiles where each tile represents a specified geographic area, each such geographic area includes gravitational-field map layers, each gravitational-field map layer corresponding to a different altitude, the gravitational-field map layers comprise at least one derived gravitational-field map layer, and gravitational-field map data for the at least one derived gravitational-field map layer is derived by applying a physics-based conversion to primary gravitational geophysical data determined at an altitude different than an altitude of the derived gravitational-field map layer;
performing error estimation by comparing the de-noised geophysical field data with the map data;
updating a position estimation of the agent based at least in part on the error estimation; and
using the updated position estimation to navigate the agent.

2. The method of claim 1, wherein the training data comprises magnetometer data, location data and altitude data associated with the agent.

3. The method of claim 1, wherein the de-noising machine learning model uses a stacked long short term memory architecture.

4. The method of claim 3, wherein the de-noising machine learning model further comprises a Tolles-Lawson model.

5. The method of claim 1, wherein receiving the geophysical field data comprises receiving gravitational field data and wherein receiving the gravitational field data comprises receiving the gravitational field data at a rate of at least 1 Hz.

6. The method of claim 1, wherein the method further comprises performing data pre-processing on the geophysical field data to provide engineered features derived from the geophysical field data.

7. The method of claim 1, wherein synchronizing the timing of the geophysical field data comprises receiving and aligning the geophysical field data from two or more geophysical field sensors that capture data at respective sampling rates.

8. The method of claim 1, wherein synchronizing the timing of the geophysical field data comprises low-pass filtering the geophysical field data to produce a consistent data rate across sensors.

9. The method of claim 1, wherein the method further comprises navigating the agent in part based on the position estimation.

10. The method of claim 1, wherein applying the physics-based conversion to the primary gravitational geophysical data determined at the altitude different than the altitude of the at least one derived gravitational-field map layer comprises applying an interpolation to the primary gravitational geophysical data determined at the altitude different than the altitude of the at least one derived gravitational-field map layer.

11. A system comprising:
one or more computers and one or more storage devices on which are stored instructions that are operable, when executed by the one or more computers, to cause the one or more computers to perform operations comprising:
receiving geophysical field data from at least one geophysical field sensor onboard an agent;
synchronizing timing of the geophysical field data;
de-noising, using a de-noising machine learning model, the geophysical field data to remove noise from local sources of noise for the at least one geophysical field sensor to produce de-noised geophysical field data, the de-noising machine learning model trained using ground truth map data and training data corresponding to the ground truth map data;
receiving map data from a geophysical map engine, wherein the map data is stored in a tile structure comprising a set of tiles where each tile represents a specified geographic area, each such geographic area includes gravitational-field map layers, each gravitational-field map layer corresponding to a different altitude, the gravitational-field map layers comprise at least one derived gravitational-field map layer, and gravitational-field map data for the at least one derived gravitational-field map layer is derived by applying a physics-based conversion to primary gravitational geophysical data determined at an altitude different than an altitude of the derived gravitational-field map layer;
performing error estimation by comparing the de-noised geophysical field data with the map data;
updating a position estimation of the agent based at least in part on the error estimation; and
using the updated position estimation to navigate the agent.

12. The system of claim 11, wherein the de-noising machine learning model uses a stacked long short term memory architecture.

13. The system of claim 12, wherein the de-noising machine learning model further comprises a Tolles-Lawson model.

14. The system of claim 11, wherein receiving the geophysical field data comprises receiving gravitational field data and wherein receiving the gravitational field data comprises receiving the gravitational field data at a rate of at least 1 Hz.

15. The system of claim 11, wherein the operations further comprise performing data pre-processing on the geophysical field data to provide engineered features derived from the geophysical field data.

16. A non-transitory computer-readable storage medium encoded with instructions that, when executed by one or more computers, cause the one or more computers to perform operations comprising:
receiving geophysical field data from at least one geophysical field sensor onboard an agent;
synchronizing timing of the geophysical field data;
de-noising, using a de-noising machine learning model, the geophysical field data to remove noise from local sources of noise for the at least one geophysical field sensor to produce de-noised geophysical field data, the de-noising machine learning model trained using ground truth map data and training data corresponding to the ground truth map data;
receiving map data from a geophysical map engine, wherein the map data is stored in a tile structure comprising a set of tiles where each tile represents a specified geographic area, each such geographic area includes gravitational-field map layers, each gravitational-field map layer corresponding to a different altitude, the gravitational-field map layers comprise at least one derived gravitational-field map layer, and gravitational-field map data for the at least one derived gravitational-field map layer is derived by applying a physics-based conversion to primary gravitational geophysical data determined at an altitude different than an altitude of the derived gravitational-field map layer;
performing error estimation by comparing the de-noised geophysical field data with the map data;
updating a position estimation of the agent based at least in part on the error estimation; and
using the updated position estimation to navigate the agent.

17. The non-transitory computer-readable storage medium of claim 16, wherein the de-noising machine learning model uses a stacked long short term memory architecture.

18. The non-transitory computer-readable storage medium of claim 17, wherein the de-noising machine learning model further comprises a Tolles-Lawson model.

19. The non-transitory computer-readable storage medium of claim 16, wherein receiving the geophysical field data comprises receiving gravitational field data and wherein receiving the gravitational field data comprises receiving the gravitational field data at a rate of at least 1 Hz.

20. The non-transitory computer-readable storage medium of claim 16, wherein the operations further comprise performing data pre-processing on the geophysical field data to provide engineered features derived from the geophysical field data.

* * * * *